(12) United States Patent
Lichtenberg

(10) Patent No.: US 9,067,610 B2
(45) Date of Patent: Jun. 30, 2015

(54) BRACKET DEVICE FOR ATTACHING A MOBILE CONTAINER TO A SMALL TRACTOR FOR LIGHT HAULING

(71) Applicant: Norman Lichtenberg, Adrian, MI (US)

(72) Inventor: Norman Lichtenberg, Adrian, MI (US)

( * ) Notice: Subject to any disclaimer, the term of this patent is extended or adjusted under 35 U.S.C. 154(b) by 0 days.

(21) Appl. No.: 14/475,664

(22) Filed: Sep. 3, 2014

(65) Prior Publication Data

US 2015/0061260 A1 Mar. 5, 2015

Related U.S. Application Data

(60) Provisional application No. 61/873,628, filed on Sep. 4, 2013.

(51) Int. Cl.
  *B62B 1/20* (2006.01)
  *B62B 5/00* (2006.01)
  *B60D 1/42* (2006.01)
  *B60D 1/00* (2006.01)

(52) U.S. Cl.
  CPC ............... *B62B 5/0079* (2013.01); *B62B 1/20* (2013.01); *B60D 1/42* (2013.01); *B60D 2001/001* (2013.01)

(58) Field of Classification Search
  CPC ................. B62B 1/20; B62B 5/0079
  USPC ............ 280/492, 415.1, 47.34, 653
  See application file for complete search history.

(56) References Cited

U.S. PATENT DOCUMENTS

| | | | | |
|---|---|---|---|---|
| 4,740,008 A | * | 4/1988 | Johnson | 280/475 |
| 5,031,926 A | * | 7/1991 | Wannamaker | 280/47.2 |
| 5,186,483 A | * | 2/1993 | Sheppard | 280/494 |
| 5,915,706 A | * | 6/1999 | Mosley | 280/47.26 |
| 7,140,630 B2 | * | 11/2006 | Abel | 280/292 |
| 7,210,697 B2 | * | 5/2007 | Simpson | 280/415.1 |
| 7,472,917 B2 | * | 1/2009 | Loudon | 280/47.34 |
| 8,408,576 B2 | * | 4/2013 | Volk | 280/293 |
| 8,444,166 B1 | * | 5/2013 | Jarvis | 280/415.1 |
| 2012/0187657 A1 | * | 7/2012 | Carroll et al. | 280/415.1 |

* cited by examiner

*Primary Examiner* — Tony Winner
(74) *Attorney, Agent, or Firm* — Vincent Re PLLC

(57) ABSTRACT

A device is provided for temporarily attaching a wheelbarrow to a tractor. The device includes a bracket device configured to permit left and right rotation of the wheelbarrow in relation to the tractor and to permit a wheel of the wheelbarrow to move up and down in relation to the tractor while preventing the wheelbarrow from tipping.

3 Claims, 5 Drawing Sheets

US 9,067,610 B2

BRACKET DEVICE FOR ATTACHING A MOBILE CONTAINER TO A SMALL TRACTOR FOR LIGHT HAULING

CROSS REFERENCE TO RELATED APPLICATIONS

This disclosure claims the benefit of U.S. Provisional Application No. 61/873,628 filed on Sep. 4, 2013 which is hereby incorporated by reference.

TECHNICAL FIELD

This disclosure is related to a bracket device designed to attach a wheelbarrow or other mobile container such as a wagon to a lawn tractor for light hauling.

BACKGROUND

The statements in this section merely provide background information related to the present disclosure. Accordingly, such statements are not intended to constitute an admission of prior art.

Property owners sometimes require the use of a trailer to do light hauling on their property. However, many property owners have little storage space for a free-standing wagon or trailer to tow behind a lawn tractor, or do not wish to purchase such a wagon or trailer.

A wheelbarrow is a known device useful for an individual to haul items short distances. A typical configuration for a wheelbarrow includes a pair of planks or straight structural members that converge toward a front end of the wheelbarrow and diverge toward a rear end of the wheelbarrow. A handle can be formed on each of the planks at the rear end of the wheelbarrow. The planks can be bolted or bracketed together at the front end of the wheelbarrow. A wheel or a plurality of wheels can be bolted or bracketed to a bottom side of the planks at the front end of the wheelbarrow. A bucket or carrying tub can be bolted or otherwise affixed to top surfaces of the planks. A stand or a set of stand legs can extend from a bottom side of the planks around the middle of the planks. In operation, when a user is not using the wheelbarrow, the wheelbarrow can rest upon the wheel or wheels and the stand. When a user is using the wheelbarrow, the user lifts up on the handles, thereby increasing an angle of the planks and lifting the stand off of the ground. When used by a user, the wheel supports a portion of the weight of the wheelbarrow and the user, providing a lifting force upon the handles, supports a remaining portion of the weight of the wheelbarrow. When the stand is on the ground, the wheelbarrow is stabilized and tends to stand still. When the handles are lifted up, the wheel can roll and the wheelbarrow is mobile. Because the wheel can support some or most of the weight of a payload placed in the bucket of the wheelbarrow, a user can move a payload with a greater weight than he or she would be able to carry by hand.

A wheelbarrow with a single wheel is unstable and subject to tipping. A user lifting up on the handles provides stability to the wheelbarrow and prevents the wheelbarrow from tipping to one side or the other. A wheelbarrow with two wheels is more stable than a wheelbarrow with a single wheel, but a such a wheelbarrow can still tip, for example, when a large load makes the wheelbarrow top-heavy or when the wheelbarrow is situated upon sloped ground.

SUMMARY OF THE DISCLOSURE

A device is provided for temporarily attaching a wheelbarrow to a tractor. The device includes a bracket device configured to permit left and right rotation of the wheelbarrow in relation to the tractor and to permit a wheel of the wheelbarrow to move up and down in relation to the tractor while preventing the wheelbarrow from tipping.

BRIEF DESCRIPTION OF THE DRAWINGS

One or more embodiments will now be described, by way of example, with reference to the accompanying drawings, in which.

DETAILED DESCRIPTION

Figure 1:
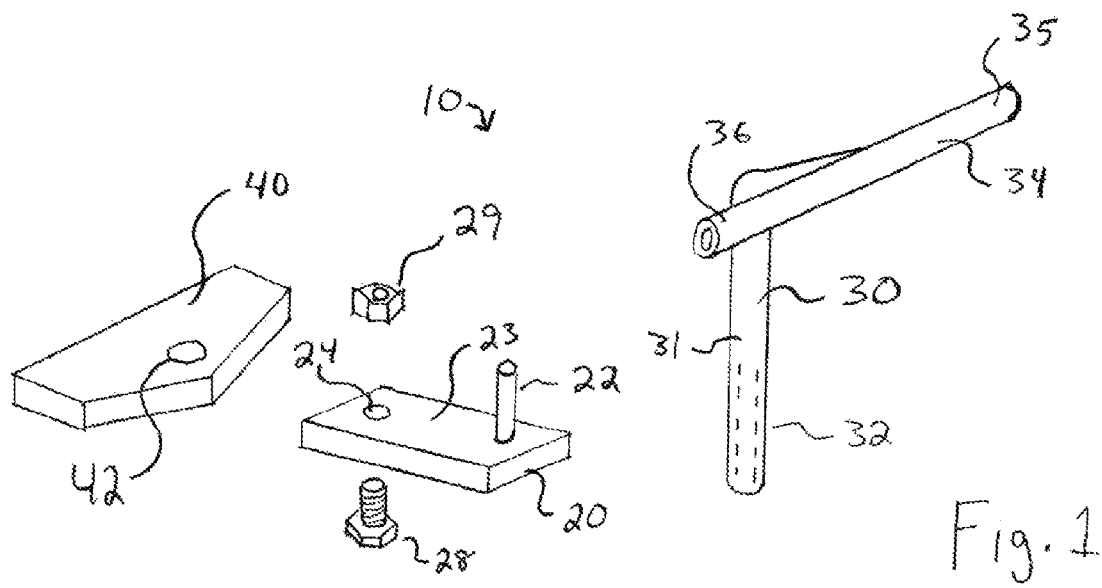
FIG. 1 illustrates an exemplary bracket device including a mounting platform and an attached cross bar for attaching a wheelbarrow to a tractor, in accordance with the present disclosure.

Referring now to the drawings, wherein the showings are for the purpose of illustrating certain exemplary embodiments only and not for the purpose of limiting the same, a compact and inexpensive bracket device to attach a wheelbarrow or other mobile container to a small tractor or lawn tractor enables a user to attach a wheelbarrow or mobile container and use it for light hauling, instead of renting or purchasing a trailer for such tasks. The bracket device can be configured to quickly attach the wheelbarrow for use as a hauling device for the tractor and selectively quickly release the wheelbarrow such that the wheelbarrow can again be used as a normal wheelbarrow.

Wheelbarrows can include one wheel or two wheels located side by side. A bracket device attaching a wheelbarrow to a tractor can lift the wheelbarrow and the associated wheel or wheels off the ground such that the wheel does not affect movement of the tractor. However, such a configuration would put significant stress on the wheelbarrow which is designed to have weight be applied through the wheel or wheels of the wheelbarrow. Also, such a configuration could adversely affect the stability of a small tractor not configured to have a large weight applied to a back of the tractor and tending to lift the front wheels of the tractor off the ground.

The disclosed bracket device is configured to permit the wheelbarrow attached to the tractor to keep its wheel or wheels on the ground. However, the bracket must include two degrees of freedom to keep the wheel or wheels on the ground while being attached to the tractor. A first degree of freedom enables the wheelbarrow to turn left or right relative to the tractor. A second degree of freedom enables the wheelbarrow to move up or down relative to the tractor such that the wheel can stay on the ground as the tractor/wheelbarrow combination travel on non-flat ground. However, the disclosed bracket device must not include a degree of freedom permitting the wheelbarrow to tip or rotate along a longitudinal axis relative to the tractor.

According to one embodiment, a bracket device for attaching a wheelbarrow or other mobile container to a lawn tractor includes a mounting platform, a support bar, a cross bar, and clamps with which to secure the handles of the wheelbarrow to the device. Elements can be constructed of steel, and bars can be hollow. The device can be welded at all joints. Rotation between a post and a hollow tube inserted thereupon can be used to enable a degree of freedom in the bracket. Rotation between a cross bar and a clamp member can enable a degree of freedom in the bracket. According to another embodiment, the bracket device can include one or more pairs of flat plates providing a bearing surface therebetween to enable a degree or degrees of freedom in the bracket. In another embodiment, a plurality of attachment points to the tractor and/or hinges can be used to enable a degree or degrees of freedom in the bracket. A number of different configurations are envisioned for providing degrees of freedom in a bracket are envisioned, and the disclosure is not intended to be limited to the particular examples provided herein.

FIG. 1 illustrates an exemplary bracket device including a mounting platform and an attached cross bar for attaching a wheelbarrow to a tractor. Bracket device 10 is illustrated including mounting plate 20, support bar 30, and cross bar 34. Support bar is configured to permit a degree of freedom in the bracket, the degree defined by post 22 and support bar shaft 31, permitting crossbar 34 to rotate to the left and right as compared to the tractor. Further, cross bar 34 is configured to attach brackets holding handles of a wheelbarrow to bracket device 10 and to permit those brackets to turn relative to the round section of cross bar 34, such that the cross bar 34 and the attached brackets are configured to permit a degree of freedom in the bracket, the degree defined by round crossbar 34 and an attached clamp-type bracket, permitting the brackets and attached wheelbarrow handles to rotate about a circumference of the round crossbar 34.

Tractor structural plate 40 is illustrated including a mounting surface configured to provide adequate rigidity to pull light objects behind the tractor. Hole 42 is provided wherein an attachment device such as a ball hitch can be mounted. In the embodiment of FIG. 1, mounting plate 20 can be attached to structural plate 40 and hole 42 with exemplary bolt 28 and nut 29. Throughout the disclosure, nut and bolt combinations are intended to be used with washers as are known in the art. Mounting plate 20 includes flat surface 23 and vertical post 22 attached thereto.

Support bar 30 is configured to support crossbar 34 and additionally to permit rotation between crossbar 34 and mounting plate 20. Support bar shaft 31 includes hollow section 32 configured to fit to vertical post 22. Hollow section 32 and vertical post 22 are configured to permit rotation. Lubrication such as axle grease can be applied to the interaction between hollow section 32 and vertical post 22.

Crossbar 34 is configured with a round cross section such that a clamp-type bracket can attach to and rotate about crossbar 34. Based upon a width of handles of a wheelbarrow to be attached, brackets are attached proximately to ends 35 and 36 of crossbar 34.

Figure 2:
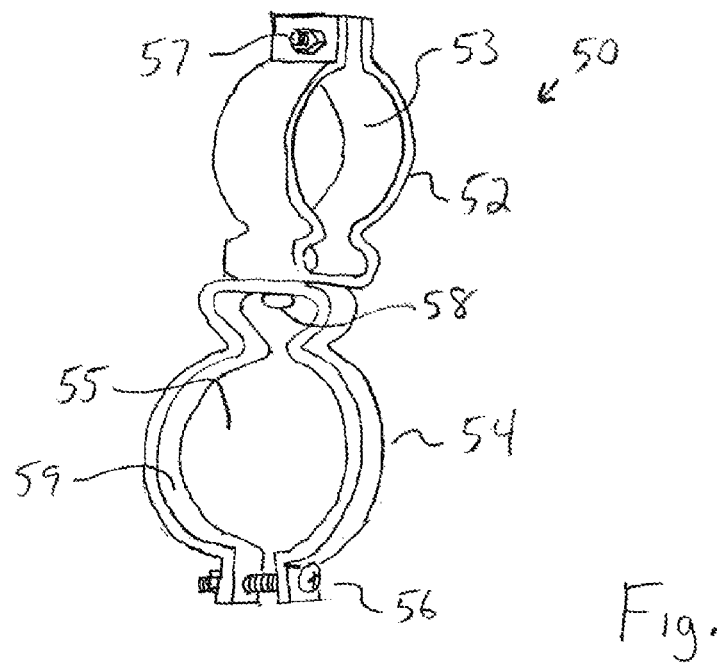
FIG. 2 illustrates an exemplary double-ended clamp that can be utilized to attach wheelbarrow handles to a cross bar, in accordance with the present disclosure.

FIG. 2 illustrates an exemplary double-ended clamp that can be utilized to attach wheelbarrow handles to a cross bar. Double-ended clamp 50 is provided as a non limiting example of a bracket that can be used to attach wheelbarrow handles to cross bar 34 of FIG. 1. Clamp-type bracket 52 and clamp-type bracket 54 are attached together with exemplary rivet fastener 58. Bracket 52 includes fastener 57 configured to adjustably clamp bracket 52 to an object inserted within bracket interior 53. Bracket 54 includes fastener 56 configured to adjustably clamp bracket 54 to an object inserted within bracket interior 55. According to one exemplary embodiment, crossbar 34 is located within bracket interior 55 and a wheelbarrow handle is located within bracket interior 53. According to one embodiment, fastener 56 can be adjusted to permit rotation between bracket surface 59 and the surface of crossbar 34 while preventing lateral movement of bracket 50 along crossbar 34. Bracket 50, by adjusting rotationally in relation to crossbar 34, is a bracket device member that rotates and enables the wheel of the attached wheelbarrow to move up and down in relation to the attached tractor.

Figure 3:
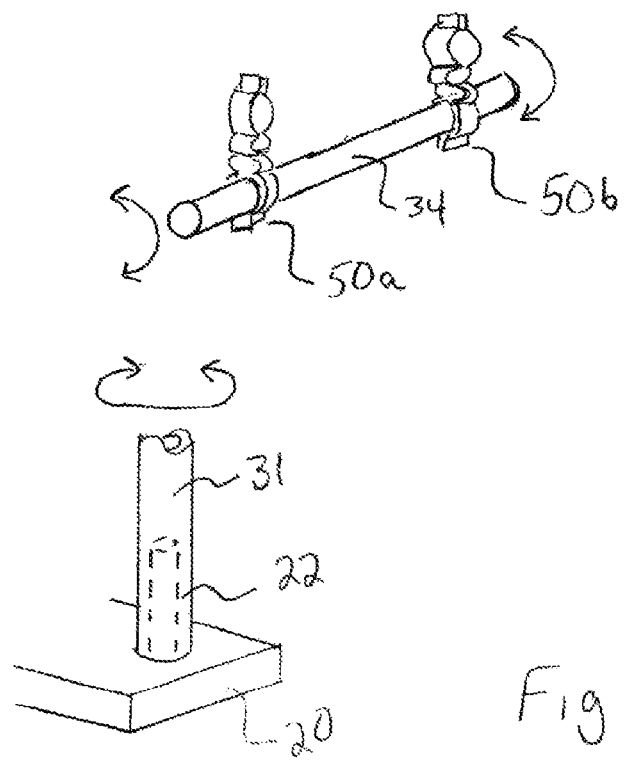
FIG. 3 illustrates the bracket device of FIG. 1, the bracket including a first degree of freedom rotating about a vertical post, permitting an attached wheelbarrow to turn left and right relative to the attached tractor, and a second degree of freedom, permitting the attached wheelbarrow to remain wheel-down on non-flat ground, in accordance with the present disclosure.

FIG. 3 illustrates the bracket device of FIG. 1, the bracket including a first degree of freedom rotating about a vertical post, permitting an attached wheelbarrow to turn left and right relative to the attached tractor, and a second degree of freedom, permitting the attached wheelbarrow to remain wheel-down on non-flat ground. Mounting plate 20 is illustrated including vertical post 22. Support bar shaft 31 is installed to vertical post 22 and can rotate about vertical post 22. Brackets 50*a* and 50*b* are illustrated affixed to crossbar 34. Brackets 50*a* and 50*b* can rotate about crossbar 34. Neither vertical post 22 and shaft 31 nor brackets 50*a* and 50*b* and crossbar 34 permit the wheelbarrow to rotate along a longitudinal axis of the attached tractor, i.e. the wheelbarrow is preventing from tipping.

Figure 4:
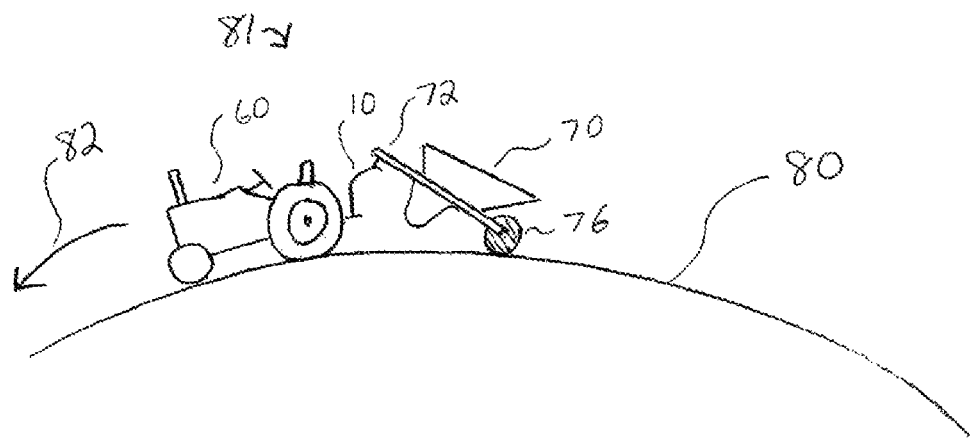
FIG. 4 illustrates the bracket device of FIG. 1 affixed to a tractor and pulling a wheelbarrow, with the tractor and wheelbarrow traversing non-flat ground, in accordance with the present disclosure.

FIG. 4 illustrates the bracket device of FIG. 1 affixed to a tractor and pulling a wheelbarrow, with the tractor and wheelbarrow traversing non-flat ground. Tractor 60 is illustrated attached to handles 72 of wheelbarrow 70 with bracket device 10. Tractor and wheelbarrow configuration 81 are traversing hill crest 80, a non-flat surface, in an arcuate path 82. If wheelbarrow 70 were rigidly attached to tractor 60, the wheelbarrow wheel 76 would either be lifted in the air or crushed into the ground on non-flat ground. A degree of freedom between tractor 60 and wheelbarrow 70 provided by bracket 10 permits the wheel 76 of wheelbarrow 70 to remain on the ground on non-flat ground.

Figure 5:
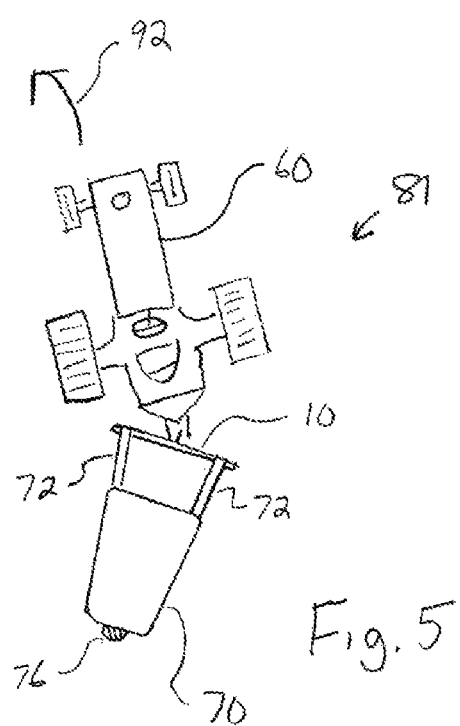
FIG. 5 illustrates the bracket device of FIG. 1 affixed to a tractor and pulling a wheelbarrow, with the tractor and wheelbarrow traversing a left turn and bracket permitting the wheelbarrow to turn relative to the tractor, in accordance with the present disclosure.

FIG. 5 illustrates the bracket device of FIG. 1 affixed to a tractor and pulling a wheelbarrow, with the tractor and wheelbarrow traversing a left turn and bracket permitting the wheelbarrow to turn relative to the tractor. Tractor 60 is illustrated attached to handles 72 of wheelbarrow 70 with bracket device 10. Tractor and wheelbarrow configuration 81 are traversing a left turn in an arcuate path 92. If wheelbarrow 70 where rigidly attached to tractor 60 through a turn and wheel 76 of wheelbarrow 70 where on the ground, wheel 76 would be pushed laterally along the ground a direction perpendicular to the normal direction of spin of wheel 76. Such forced lateral movement of the wheel 76 can damage the wheel or wheelbarrow 70. A degree of freedom between tractor 60 and wheelbarrow 70 provided by bracket 10 permits the wheel 76 of wheelbarrow 70 to remain on the ground through a turn without forcing the wheel to move in a lateral direction.

Figure 6:
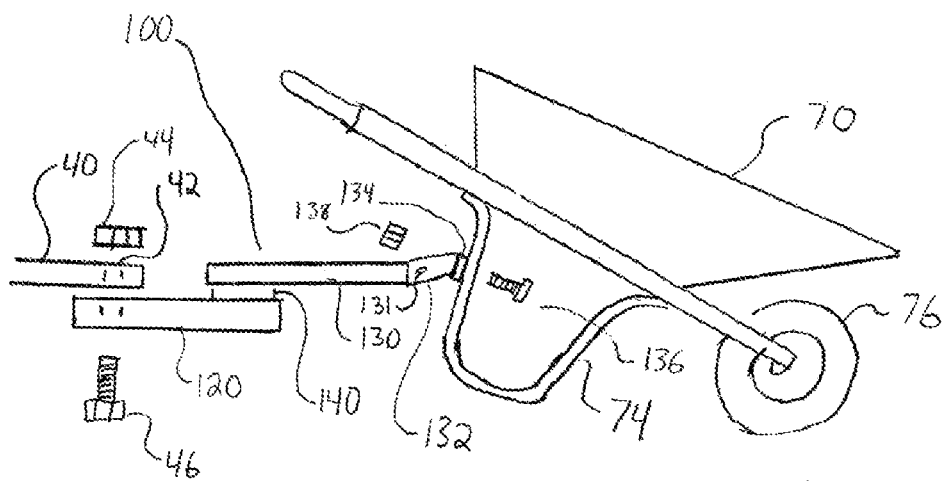
FIG. 6 illustrates an alternative exemplary embodiment of a bracket device including a flat pivoting bearing surface and a bracket attachment to legs of a wheelbarrow, in accordance with the present disclosure.

FIG. 6 illustrates an alternative exemplary embodiment of a bracket device including a flat pivoting bearing surface and a bracket attachment to legs of a wheelbarrow. Tractor structural plate 40 is illustrated including hole 42. Bracket device 100 is illustrated. Mounting plate 120 is illustrated attached to plate 40 with nut 44 and bolt 46. Rotating bracket member 130 is illustrated attached to mounting plate 120 through bearing member 140. Bearing member 140 can take many forms. In the embodiment of FIG. 6, bearing member 140 includes a ball bearing hinge, permitting rotating member 130 to rotate to the left and to the right relative to mounting plate 120. Additionally, rotating member 130 is attached to pivoting bracket member 132 at hinge 131, such that pivoting bracket member 132 can rotate relative to rotating member 130. The rotation of pivoting bracket member 132 enables wheelbarrow 70 to travel over non-flat ground, keeping wheel 76 on the ground. Wheelbarrow 70 is illustrated attached to pivoting bracket member 132 at each of two wheelbarrow legs 74 with exemplary nut 138 and bolt 136 at two leg attachment points 134 of member 132.

Figure 7:
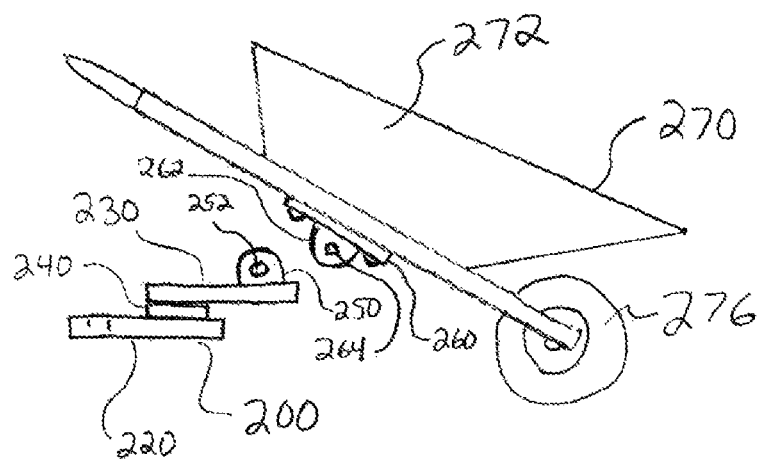
FIG. 7 illustrates an alternative exemplary embodiment of a bracket device including a flat pivoting bearing surface and a bracket plate affixed to a container body of the wheelbarrow, in accordance with the present disclosure.

FIG. 7 illustrates an alternative exemplary embodiment of a bracket device including a flat pivoting bearing surface and a bracket plate affixed to a container body of the wheelbarrow. Bracket device 200 is illustrated including mounting plate 220 configured to be attached to a tractor structural plate. Rotating member 230 is illustrated attached to mounting plate 220 thought bearing member 240. In the embodiment of FIG. 7, bearing member 240 is illustrated to include a flat bearing plate or a large washer. Connected to rotating member 230 includes vertical flat bearing plate 250 including hole 252. Wheelbarrow 270 includes an affixed bracket 260 connected to a container body 272 of the wheelbarrow. Affixed bracket 260 can be bolted, riveted or otherwise attached to the container body 272 between two legs of the wheelbarrow along a centerline of the container body 272. Affixed bracket 260 includes vertical flat bearing plate 262 including hole 264. A bolt, rivet, or other axle member can attach plates 250 and 262 at holes 252 and 264, such that bracket 260 can rotate relative to rotating member 230 and permit wheelbarrow 270 to travel over non-flat ground, keeping wheel 276 on the ground.

Figure 8:
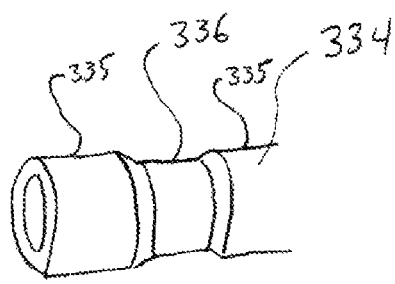
FIG. 8 illustrates an alternative embodiment of a cross bar that can be used to retain a bracket configured to rotate relative to the cross bar, in accordance with the present disclosure.

FIG. 8 illustrates an alternative embodiment of a cross bar that can be used to retain a bracket configured to rotate relative to the cross bar. Brackets can be attached to a crossbar such that the brackets can rotate relative to the crossbar. However, such adjustment or calibration of the brackets relative to the crossbar can permit some brackets to move laterally along the crossbar. A number of configurations are envisioned to prevent the brackets from moving laterally along a crossbar. Crossbar 334 is illustrated including flat surface 335 and reduced diameter surface 336. By attaching an exemplary clamp-type bracket to reduced diameter surface 336, the bracket can rotate about surface 336, but the wider diameter of adjoining surfaces 335 prevent the bracket from moving laterally along the crossbar.

Figure 9:
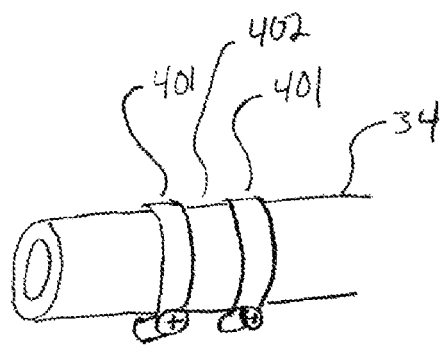
FIG. 9 illustrates an additional alternative embodiment of a cross bar that can be used to retain a bracket configured to rotate relative to the cross bar, in accordance with the present disclosure.

FIG. 9 illustrates an additional alternative embodiment of a cross bar that can be used to retain a bracket configured to rotate relative to the cross bar. Crossbar 34 is illustrated. An exemplary clamp-type bracket can be secured to location 402 on crossbar 34. Exemplary constriction bands 401 can be secured upon either side of location 402 as another exemplary method to permit brackets to rotate around crossbar 34 while preventing the brackets from moving laterally along crossbar 34.

Clamp-type brackets are provided as an inexpensive structure to attach handles of a wheelbarrow to a crossbar. Customized brackets, molded brackets, brackets with specifically sized holes, rotating bearing devices, and other devices known in the art can alternatively be used in plate of clamp-type brackets throughout the disclosure, and the disclosure is not intended to be limited to the examples specifically provided herein.

Figure 10:
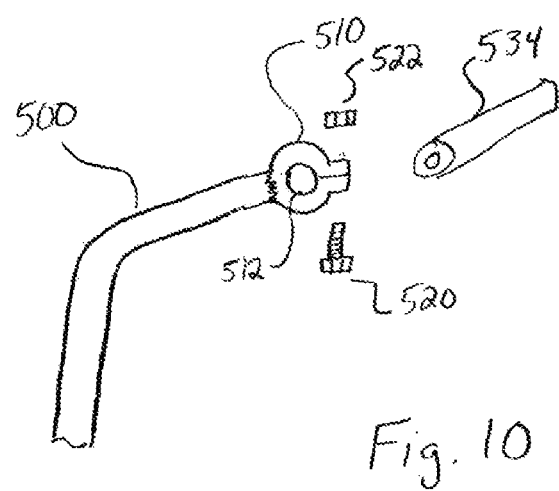
FIG. 10 illustrates an alternative embodiment of a cross bar that can be used to permit rotation relative to a support bar of a bracket device, in accordance with the present disclosure.

FIG. 10 illustrates an alternative embodiment of a cross bar that can be used to permit rotation relative to a support bar of a bracket device. Support bar 500 of a bracket device is illustrated including a connected clamp connection 510. Exemplary bolt 520 and nut 522 can be used to clamp crossbar 534 within hole 512 of clamp connection 510. Clamp connection 510 can be adjusted or calibrated such that crossbar 534 can rotate relative to support bar 500. Such a configuration can be used in place of clamp-type brackets rotating about a crossbar as is illustrated in FIG. 3.

Figure 11:
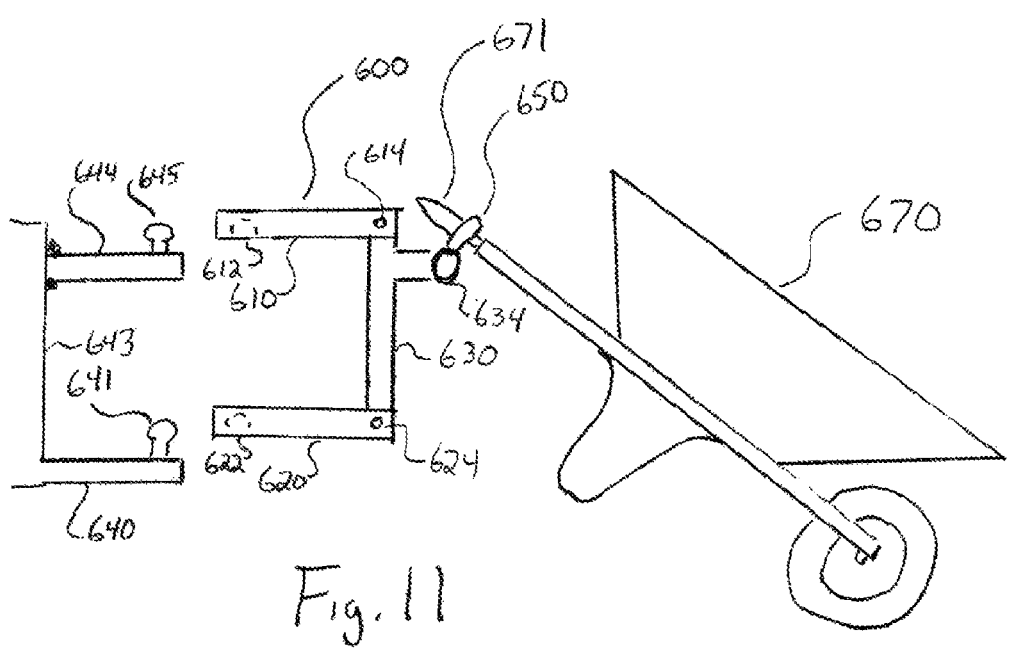
FIG. 11 illustrates an alternative exemplary embodiment of a bracket device including a pair of ball hitch connections and a four bar linkage, in accordance with the present disclosure.

FIG. 11 illustrates an alternative exemplary embodiment of a bracket device including a pair of ball hitch connections and a four bar linkage. Ball hitch connections are used in the art to tow a trailer behind a vehicle such as a tractor. A ball hitch connection is good at providing a towing force, but is generally configured to permit full rotation of a ball connecting member about the ball hitch. While such a ball hitch connection is flexible and permits smooth movement of a trailer behind a vehicle, such a connection is not good at preventing a trailer from tipping. The ball connecting member can rotate longitudinally in relation to the ball hitch. FIG. 11 illustrates a pair of ball hitches being used to provide a bracket device according to the disclosure. While one ball hitch connection fails to prevent a trailer from tipping or rotating relative to the tractor or vehicle, two ball hitch connections, one above the other, allow a connected bracket device to rotate left and right while preventing tipping. Further, the ball hitch connections permit attached connecting members to angle up or down behind the hitch connection. Bracket device 600 is illustrated including a first connecting member 620 connecting to a lower ball hitch 641 located upon tractor structural plate 640. Additionally, an upper ball hitch 645 is illustrated upon a second tractor structural plate 644 connected to tractor member 643. Second connecting member 610 of bracket device 600 is illustrated connecting to upper ball hitch 645. Second tractor structural plate 644 can be welded, bolted, or otherwise added to an existing tractor member 643. According to one embodiment, lower ball hitch 641 and upper ball hitch 645 are located one above the other, such that attached connecting members 620 and 610 rotate about a common center of rotation if viewed from above. Additionally, bracket device 610 attached to ball hitches 641 and 645, the bracket device including connecting members 620 and 610 each connected to vertical bar member 630 at hinge points 624 and 614, respectively, creates a four bar linkage which permits vertical bar member 630 to move up and down relative to the attached tractor when the wheelbarrow is moved over non-flat ground. Vertical bar member 630 includes crossbar 634 which is attached to wheelbarrow handles 671 of wheelbarrow 670 by rigid brackets 650. Brackets 650 can be rigid and non-rotating due to the up and down movement that can be achieved through the four bar linkage of bracket device 600. By connecting to a ball hitch, either of the connecting members can be said to be permitting or enabling both left and right motion of the wheelbarrow in relation to the tractor and up and down motion of the wheel of the wheelbarrow in relation to the tractor.

The disclosure discusses attachment of a wheelbarrow to a small tractor. One will appreciate the that disclosed bracket could be used with many varieties of small wagons, carts, or other utility push or pull vehicles, and the disclosure is not intended to be limited to the particular examples provided herein.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device attaching a wheelbarrow to a tractor, the device comprising:
    a bracket device configured to permit left and right rotation of the wheelbarrow in relation to the tractor and to permit a wheel of the wheelbarrow to move up and down in relation to the tractor while preventing the wheelbarrow from tipping;
    wherein the bracket device comprises:
        a first rotating bracket member enabling the left and right rotation of the wheelbarrow;
        a second rotating bracket member enabling the wheel of the wheelbarrow to move up and down;
    wherein the second rotating bracket member comprises two bracket devices connected to a horizontal crossbar, wherein each of the two bracket devices connects to one of two handles of the wheelbarrow; and
    wherein each of the bracket devices is configured to rotate relative to the crossbar.

2. The device of claim 1, wherein the bracket devices each comprise two clamp-type bracket devices affixed together.

3. A device attaching a wheelbarrow to a tractor, the device comprising:
    a bracket device configured to permit left and right rotation of the wheelbarrow in relation to the tractor and to permit a wheel of the wheelbarrow to move up and down in relation to the tractor while preventing the wheelbarrow from tipping, the bracket device comprising:
        a mounting plate attached to a structural plate of the tractor;
        a vertical post attached to the mounting plate;
        a hollow bar applied to the vertical post, wherein rotation of the hollow bar about the post enables the left and right rotation of the wheelbarrow;
        a horizontal crossbar configured to rotate with the hollow bar; and
        two bracket devices, each connecting to one of two handles of the wheelbarrow, wherein each of the bracket devices is configured to rotate relative to the crossbar and enable the wheel of the wheelbarrow to move up and down.

* * * * *